United States Patent [19]

Morris et al.

[11] Patent Number: 4,909,851

[45] Date of Patent: Mar. 20, 1990

[54] PIGMENT COMPOSITIONS

[75] Inventors: David J. Morris, Glasgow; Christopher Newton, Johnstone, both of Scotland

[73] Assignee: Ciba-Geigy Corporation, Ardsley, N.Y.

[21] Appl. No.: 5,512

[22] Filed: Feb. 20, 1987

Related U.S. Application Data

[63] Continuation-in-part of Ser. No. 833,413, Feb. 20, 1986, abandoned, which is a continuation of Ser. No. 689,035, Jan. 7, 1985, abandoned, which is a continuation of Ser. No. 516,824, Jul. 25, 1983, abandoned.

[30] Foreign Application Priority Data

Jul. 31, 1982 [GB] United Kingdom ................. 8222168

[51] Int. Cl.[4] .............................................. C09B 67/02

[52] U.S. Cl. ..................................... 106/400; 106/316

[58] Field of Search ........................................ 106/309

[56] References Cited

U.S. PATENT DOCUMENTS

| | | | |
|---|---|---|---|
| 3,730,747 | 5/1973 | Belde et al. | 106/288 B |
| 3,792,656 | 2/1974 | Heissenberger | 100/118 |
| 3,906,853 | 9/1975 | Wohlfourter | 100/118 |
| 4,147,101 | 4/1979 | Heissenberger | 100/118 |
| 4,173,492 | 11/1979 | Pollard | 106/308 F |

FOREIGN PATENT DOCUMENTS

| | | |
|---|---|---|
| 1055776 | 6/1979 | Canada . |
| 1060262 | 8/1979 | Canada . |
| 1121210 | 4/1982 | Canada . |
| 2805883 | 8/1978 | Fed. Rep. of Germany . |
| 1186390 | 2/1959 | France . |
| 1292966 | 4/1962 | France . |
| 222221 | 9/1924 | United Kingdom . |
| 1195847 | 6/1970 | United Kingdom . |
| 1512960 | 1/1978 | United Kingdom . |
| 1518326 | 7/1978 | United Kingdom . |
| 2140022 | 11/1984 | United Kingdom . |
| 2140022A | 11/1984 | United Kingdom . |

OTHER PUBLICATIONS

Pannevis Brochure, p. 16.
Aufbereitungs-Technik 6, 287-294 (1982).
Webster's Ninth New Collegiate Dictionary, pp. 234, 469 and 21 (1985).

*Primary Examiner*—John F. Niebling
*Assistant Examiner*—Isabelle Rodriquez
*Attorney, Agent, or Firm*—Harry Falber

[57] ABSTRACT

New pigment compositions, in storage-stable free-flowing flake form comprise (a) pigment; and (b) water in a maximum amount of 10% by weight above the critical moisture content of the pigment component.

The pigment compositions are produced by partially de-watering conventional aqueous pigment compositions, especially aqueous pigment filter-cakes.

1 Claim, 1 Drawing Sheet

PIGMENT COMPOSITIONS

CROSS-REFERENCE

Figure 1:
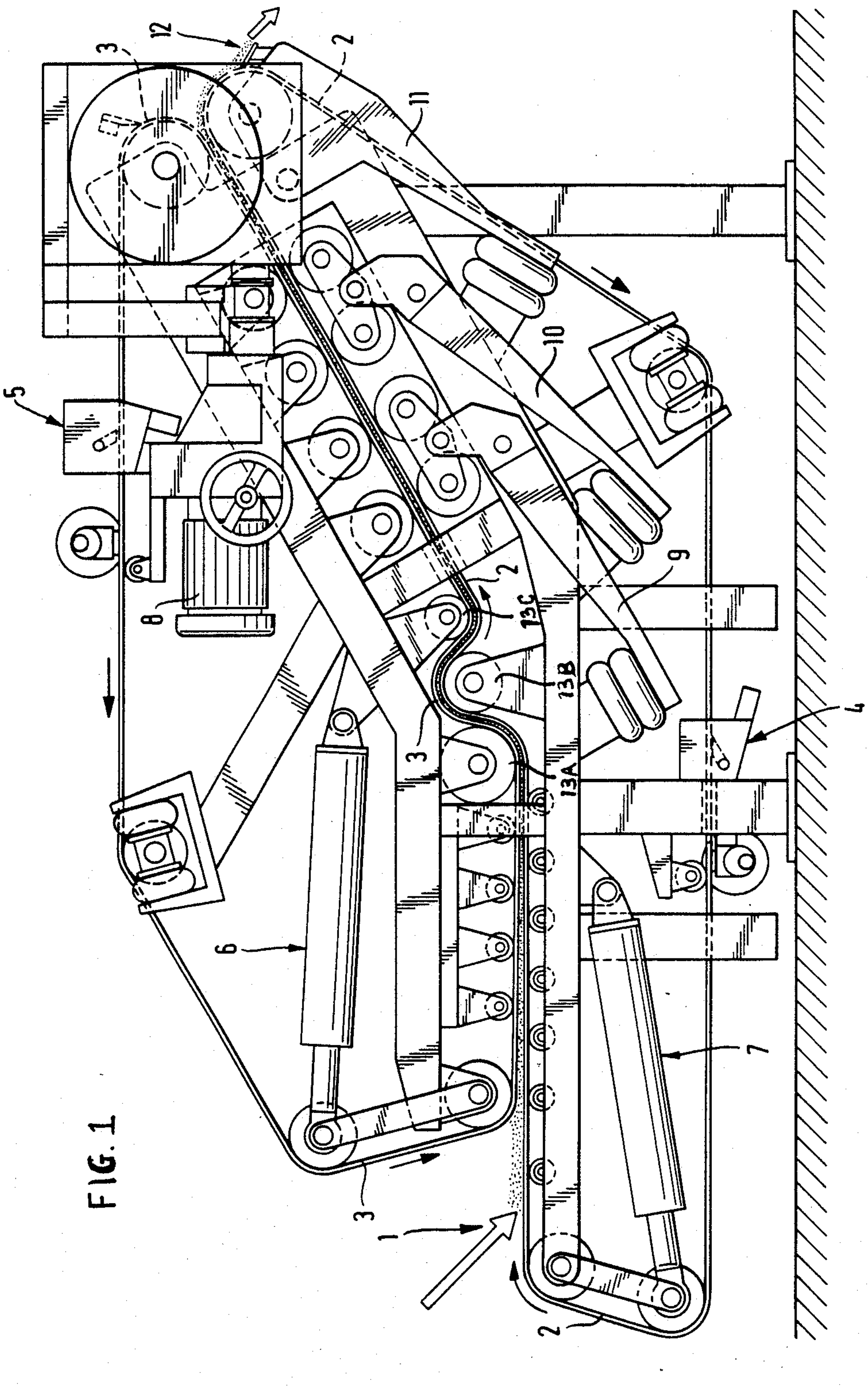

This is a continuation-in-part of application Ser. No. 833413 filed Feb. 20th 1986, now abandoned, which in turn is a continuation of application Ser. No. 698,035, filed Jan. 7, 1985, now abandoned, which is a continuation of application Ser. No. 516,824, filed July 25, 1983, now abandoned.

The present invention relates to pigment compositions containing pigment and a critical proportion of water; to a method of producing such pigment compositions; and to applicational media containing such pigment compositions.

When produced on a commercial scale, pigments are usually obtained as aqueous press-cakes containing large amounts (60–80% by weight) of water.

Such pigment press-cakes can be used directly for the colouration of aqueous applicational media e.g. aqueous paints and aqueous inks. Such direct use of pigment press-cakes is disadvantageous however, e.g. in the following respects: the press-cake is not easy to handle or transport; and the flushing of the press-cake into an ink varnish, while separating the water from the mixture, requires a high-energy kneader.

To avoid such problems, it is also known to dry the pigment press-cakes e.g. by heating them at elevated temperatures ranging from 80° to 150° C. until the moisture content of the dried product is below 1% by weight. While direct colouration with such dry pigments avoids the need to use expensive flushing techniques, the use of dry pigments is associated with other, equally serious disadvantages.

Thus, when commercially-produced, aqueous pigment press-cakes contain pigment as very fine crystals (primary particles). On drying, the primary pigment particles agglomerate to produce larger particles (secondary particles). In order to re-convert the secondary particles into primary particles, e.g. while dispersing dry pigment powder in a resin or varnish, much time and energy is required.

Moreover, the drying step involves time and energy to remove most of the water; an additional pulverization step is required to break down dried pigment clumps; and handling the pigment powder results in dusting causing working environment hazards. Moreover, the dry agglomeration of the pigment particles is associated with a deterioration in pigmentary properties as manifested by change of hue and reductions in transparency, colour strength, gloss and ease of dispersion in applicational media.

Surprisingly, we have now found that by only partially de-watering conventional pigment press-cakes or dispersions, a pigment composition is obtained which is in easily-handled, free-flowing flake form and contains pigment particles in non-agglomerated form.

Accordingly, the present invention provides a pigment composition, in free-flowing storage stable flake form, comprising:

(a) pigment; and (b) water in a maximum amount of 10% by weight above the critical moisture content of the pigment component.

Preferably, the amount of water is equal to, or less than the critical moisture content of the pigment.

The critical moisture content of a particulate substance, such as a pigment, is that percentage by weight of water retained in the interstices of the particles after all the freely available surface water has been removed. The critical moisture content of a particular substance is affected by its particle size and the nature of its surfaces. In addition, the presence of additives which, in the case of pigments, are typically resins or surfactants, also affect the critical moisture content. The critical moisture content is normally established experimentally from the drying curve of a product and is defined as the transition point from the "constant rate period" to the "falling rate period".

The present invention also provides a method for producing a pigment composition according to the present invention, comprising partially de-watering a pigment filter-cake by feeding the filter-cake into the nip between two counter-rotating endless bands; which bands move under tension around one or more rollers, preferably of decreasing diameter, thereby applying surface pressure to said filter-cake and subsequently causing the product so treated to be subjected to variable line pressure viz. the variable compressive force exerted on the filter-cake per unit thickness of the cake; the bands comprising a material permeable to the liquid in the filter-cake; provided that, for each dewatered pigment product the conditions of surface pressure, line pressure and band speed are so chosen that the final water content of each product is no more than 10% greater and is preferably equal to or less than the critical moisture content of the pigment.

In contrast to this new method for producing the pigment compositions of the present Application, known de-watering techniques are not suitable for this purpose.

For instance, in British Patent Specification No. 1516326 there is described a process for increasing the solids content of pigment filter-cakes, comprising feeding the filter-cakes into the nip between a pair of circumferentially-grooved perforated and counter-rotating rollers; and applying vacuum to the interior of the rollers sufficient to cause the liquid which is squeezed from the coke by the rollers, to be drawn into the interior of the rollers and thereby removed from the press-cake. The distance between the rollers can be adjusted to give a "line pressure" of 3.5 to 10.5 N/mm.

The method of the present invention is distinguished over that of GB 1516326 in that the former uses a combination of surface pressure and line pressure, the line pressure used being an order of magnitude greater than that used in GB 1516326.

In one embodiment of the method of the invention, pigment filter-cake containing 35–40 wt. % of solids is fed on to the lower band of a press device comprising an upper and lower band activated by a variable speed motor and equipped with separate washing devices, the tension of the bands being variable by means of separate tension arms; and which are squeezed together by passing around one or more, preferably two or more rollers, preferably of decreasing diameter, and then through the nip between one or more pairs of rollers and a product exit area. One method of adding lump filter-cake on to the lower band is by granulating the filter-cake e.g. in a roller granulator and then feeding the filter-cake so granulated onto the band. Alternatively, the filter-cake may be fed by a cleated-band rate feeder.

The band tension, the size, number and orientation of the "surface pressure" rollers, the number of pairs of rollers and the pressures applied to them as well as the band speed are selected to give an optimum de-watering effect whilst avoiding "squeezing-out" of filter-cake at the edges of the bands, producing a product with a final water content not greater than 10% above the critical moisture content of the pigment in the filter-cake or suspension to be dewatered. The dewatered product is conveniently discharged by means of blades set close to the bands.

Any high-line pressure, de-watering press may be used in the method of the invention. A convenient press for effecting the process of the invention is the Andritz press which is illustrated in the accompanying FIG. 1; this is a side diagrammatic view of an arrangement which is suited to the de-watering of pigment filter-cake and suspensions.

The belt filter press, shown in FIG. 1, has a filter-cake entrance at 1 and a lower endless cloth 2 and an upper endless cloth 3. Cloth 2 and cloth 3 are moved at the same linear velocity by a variable speed motor 8. The band speed may range from 1 to 6.5 meters/minutes. Cloth 2 is provided with a washing device 4 and cloth 3 similarly equipped with a washing device 5. Likewise, upper and lower cloths 3 and 2 are tensioned by arms 6 and 7, each being operated by variable pressure up to 3.5 bar, and determining the levels of pressure applied as the bands move around the three surface-pressure rollers 13A, 13B and 13C. The line pressure is applied by means of pressure arms 9 (zone 1 line pressure range from 50 N/mm up to a max. line pressure 150 N/mm), 10 (zone 2 line pressure range from 100 N/mm up to a max. line pressure 180 N/mm) and 11 (zone 3 line pressure range from 200 N/mm up to a max. line pressure 250 N/mm). At the product exit 12, discharge is effected conveniently by using a knife blade.

The product of the invention is in storage stable flake form 12 typically having a dry content of between 60% and 80%, (40 to 20% water). This can be compared with a typical dry content of between 15% and 45% for a filter-cake from a plate and frame press or a typical dry content of between 5% and 35% for a pigment slurry. Generally, optimal dryness of end product is achieved by using relatively low band speeds (1.0 to 5.0 m/min) and by increasing stepwise the respective line pressures.

The pigments useful in the present invention may be either organic or inorganic. Preferably, organic pigments are used because they suffer the prior art problems more frequently. Pigments are not limited to any specific types. Examples of organic pigments are azo pigments, azo condensation pigments, phthalo-cyanine pigments, quinacridone pigments, indigo pigments, quinophthalone pigments, dioxane pigments, anthraquinone pigments, isoindolinone pigments, and the like.

The pigment composition of the invention has a number of advantages and features.

1. The products of the process of the invention are dry in appearance, low-dusting or dust-free, storage stable and free-flowing. Although the very severe de-watering treatment of the invention would have been expected to cause compaction and hence adversely affect the dispersibility of the treated pigment, surprisingly, the products of the process of the invention have been found to have comparable dispersibility relative to the filter-cake starting material.

2. The composition has a moisture content lower than a wet cake of a pigment and is dispersed to give a dispersion product with a desired high concentration.

3. When a wet cake of a pigment is dispersed in various dispersion media such as resins or varnishes, it is necessary that the hard cake is crushed for preliminary dispersion with a high speed mixer or a dissolver. However, use of the pigment composition of the invention facilitates the dispersion within a short time without need of any preliminary dispersion (i.e. good working performance).

4. Handling, transport, packing and colour mixing may be carried out in a manner similar to the case of dry pigment powder.

5. In handling, the composition of the invention comprising fine particles containing water does not substantially produce any dust and does not worsen working environments. In this sense, the composition may be called "dustless pigment".

6. No complicated steps of drying and grinding as required in dry pigment powder are necessary. Dehydration and grinding may be continuously, efficiently effected within a short time. Because the composition is not completely dehydrated, too large an amount of energy is not required.

7. The process of the invention eliminates or, where most of the residual water in the dewatered flakes is removed by thermal drying, reduces the aggregation caused by the thermal drying process. Such elimination or reduction of thermal drying provides savings in manufacturing costs. More importantly, the elimination or reduction of aggregation caused by thermal drying imparts significant benefits in the pigmentary quality of the products so obtained and in reduced finishing costs. For example, comparing the dewatered flake products of the invention with dry powder, ease of processing e.g. dispersion times are significantly reduced and the flake products have superior gloss, transparency, brightness and strength. Compared to filter-cake, the dewatered flakes offer considerable benefits in formulation flexibility and easier handling.

8. Because of the moisture content, the composition may be efficiently dispersed within a short time in aqueous dispersion media of the polar solvent type using alcohols, etc. which may contain a small amount of water e.g. nitrocellulose inks. As a result, coloured dispersions of high quality can be obtained.

Likewise, when used in combination with non-aqueous dispersion media of the non-polar solvent type, dispersion media not affected by water remaining in small amounts, or dispersion media capable of removing water upon dispersion, the composition can yield coloured dispersions.

9. The flakes so produced are not only storage stable to evaporation but also can be reduced in size, if required, to a meterable form and used with all the above mentioned advantages and applications.

The following Examples further illustrate the present invention. Percents are percents per weight.

EXAMPLES 1 TO 4

An aqueous C.I. Pigment Yellow 3 filter-cake having a solids content of 36% is subjected to de-watering using the apparatus illustrated in FIG. 1 using the following process parameters:

| | | |
|---|---|---|
| Band speed | | 1.10 m/min |
| Cloth tensioning pressure | upper | 2.5 Bar |
| | lower | 2.5 Bar |
| Line pressures | zone 1 | 150 N/mm |
| | zone 2 | 175 N/mm |

-continued

| | | |
|---|---|---|
| | zone 3 | 230 N/mm |
| Discharge rate | | 120 kg/h |

The product is dust-free and has a moisture content of 30% which is less than its critical moisture content of 32% as determined experimentally. [In that respect see Perry's Chemical Engineers Handbook, from John H. Perry, 4th Edition 1963, Publisher Mcgraw Hill].

Similar results are obtained with C.I. Pigment Yellow 13, Blue 15 and Blue 66.

EXAMPLE 5

A pigment composition comprising 85% of aqueous C.I. Pigment Yellow 13 filter-cake and 15% acrylic resin, is subjected to de-watering using the apparatus illustrated in FIG. 1 using the following process parameters:

| | | |
|---|---|---|
| Band speed | | 4.35 m/min |
| Cloth tensioning pressure | upper | 2.5 Bar |
| | lower | 2.5 Bar |
| Line pressures | zone 1 | 55 N/mm |
| | zone 2 | 75 N/mm |
| | zone 3 | 135 N/mm |
| Discharge rate | | 120 kg/h |

The product is non-dusting, free-flowing and has a moisture content of 45% which is less than its critical moisture content of 50% as determined experimentally.

EXAMPLES 6 TO 14

Using the procedure described in Examples 1 to 4, further pigments were de-watered under the operating conditions summarized in Table 1.

| | | Operating Conditions | | | | | | |
|---|---|---|---|---|---|---|---|---|
| | | Cloth Tensioning Pressures (bar) | | Zone Line Pressures (bar) | | | | Discharge Rate |
| Ex | Pigment | Upper | Lower | 1 | 2 | 3 | % $H_2O$ | (Kg/hr) |
| 6 | P.Y. 13 (unresinated) | 2.5 | 2.5 | 1.3 | 2.5 | 4.0 | 35 | 90 |
| 7 | P.Y. 1 | 2.5 | 2.5 | 2.0 | 3.0 | 5.0 | 36 | 70 |
| 8 | P.Y. 74 | 2.5 | 2.5 | 2.0 | 3.0 | 4.0 | 35 | 83 |
| 9 | P.Y. 13 (resinated) | 2.5 | 2.5 | 2.0 | 3.0 | 4.0 | 33 | 110 |
| 10 | P.R. 112 | 2.5 | 2.5 | 1.0 | 2.0 | 3.0 | 40 | 50 |
| 11 | P.B. 15.1 | 2.5 | 2.5 | 1.5 | 3.0 | 4.5 | 38 | 80 |
| 12 | P.B. 15.3 | 2.5 | 2.5 | 1.5 | 3.0 | 4.5 | 37 | 107 |
| 13 | P.R. 571 | 2.5 | 2.5 | 1.5 | 3.0 | 4.5 | 36 | 86 |
| 14 | Indigo Blue | 2.5 | 2.5 | 0.5 | 1.5 | 4.5 | 30 | 86 |

PY = Pigment Yellow; PR = Pigment Red; and PB = Pigment Blue

EXAMPLE 15

(A) Preparation of stabilised aqueous dispersions.

A sample of the product of the invention under test is fluidised with a small amount of surfactant, water and ethylene glycol using a high speed stirrer until the mixture is well dispersed and no particles are greater than 250 u in size. This paste is then recirculated through a horizontal bead null until the pigment is fully dispersed in a very finely divided form and the optimum colour value has been achieved.

(B) Emulsion paint test.

A sample of the stabilised aqueous dispersion according to the invention under test is weighed into a glass dish. The quantity used is 2.40 gm dry pigment weight and to this is added 30.0 gm white emulsion paint and this is stirred until homogeneous. Using a No. 5 k-bar the paint is drawn down against standard i.e. the paint using conventionally dried pigment on white card and assessed visually for strength, hue and flocculation resistance as seen in Table 2.

TABLE 2

| Emulsion Paint Tests | | | | |
|---|---|---|---|---|
| Product of Example | Ease of processing | Strength | Hue | Flocculation resistance |
| 1 | S | S | S | S |
| 6 | S | E | S | E |
| 7 | S | E | S | E |
| 8 | S | S | S | E |
| 10 | S | S | E | S |
| 11 | S | E | S | E |
| 12 | S | E | S | S |
| 14 | S | E | E | S |

Key:
S = superior to control (using equivalent pigment powder in step A)
E = Equivalent to control
I = Inferior to control

EXAMPLE 16

Nitrocellulose Ink Test

Nitrocellulose and each of the de-watered products of the invention under test, were ball-milled in the presence of solvent for 16 hrs to produce a 18% mill-base with a pigment:binder ratio of 2:1. This mill base was further diluted with resin, nitrocellulose and solvent to produce a 12% final ink with a pigment to binder ratio of 1:1.4. This ink was applied using a k-bar to a variety of substrates including cellophane aluminium foil and coated paper to evaluate transparency, hue, gloss, dispersibility and colour strength. Subsequently each pigment product was compared against controls based on the same pigment used as a conventional dry powder as can be seen in Table 3.

TABLE 3

| Nitrocellulose ink test | | | | | |
|---|---|---|---|---|---|
| Product of Example | Dispersibility | Gloss | Transparency | Hue | Strength |
| 6 | E | S | S | S | S |
| 9 | E | S | S | S | S |

EXAMPLE 17

Water-borne acrylic ink test.

The pigment product according to the invention under test was ball-milled for 16 hrs with an acrylic resin in the presence of water and anti-foam to produce a 16% mill-base having a pigment:binder ratio of 1:0.75. This mill-base concentrate was further diluted with resin and water to produce a 12% ink having a pigment:binder ratio of 1:1.02. This ink was drawn down on various substrates using a k-bar applicator and evaluated for dispersibility, gloss, transparency, hue and strength against a control which was an ink based on the same pigment as a conventional dry powder. The results obtained are shown in Table 4.

TABLE 4

| Water-born acrylic ink test. | | | | | |
|---|---|---|---|---|---|
| Product of Example | Dispersibility | Gloss | Transparency | Hue | Strength |
| 5 | S | S | S | S | S |

TABLE 4-continued

Water-born acrylic ink test.

| Product of Example | Dispersibility | Gloss | Transparency | Hue | Strength |
|---|---|---|---|---|---|
| 6 | E | S | S | S | S |
| 9 | E | S | S | S | S |

I claim:

1. Method of producing a free flowing, storage-stable pigment composition consisting essentially of a pigment in flake from containing water in a maximum amount of 10% by weight above the pigment's critical moisture content comprising de-watering a conventional pigment press-cake containing 60–80% by weight of water, in a press comprising two counter-rotating endless bands moving under tension around one or more rollers which applies surface pressure to said filter-cake; subsequently causing said filter-cake to be subjected to variable line pressure of 50 N/mm to 250 N/mm between one or more pairs of rollers to which a variable pressure is applied; the conditions of surface pressure, line pressure and band speed being so chosen that the final water content of the pigment composition is no more than 10% by weight above the critical moisture content of the pigment, and removing the de-watered pigment from the press in a manner to provide the composition in flake form.

* * * * *

UNITED STATES PATENT AND TRADEMARK OFFICE

CERTIFICATE OF CORRECTION

PATENT NO. : 4,909,851

DATED : MARCH 20, 1990

INVENTOR(S) : CHRISTOPHER NEWTON, ET AL

It is certified that error appears in the above-identified patent and that said Letters Patent is hereby corrected as shown below:

On the cover page, Item [22], should read

-- Filed: Jan. 20, 1987 --.

Signed and Sealed this

Twenty-sixth Day of November, 1991

*Attest:*

HARRY F. MANBECK, JR.

*Attesting Officer*

*Commissioner of Patents and Trademarks*